United States Patent [19]

Morse

[11] Patent Number: 4,807,666
[45] Date of Patent: Feb. 28, 1989

[54] STOPCOCK VALVE FOR HIGH PRESSURE APPLICATIONS

[75] Inventor: Phillip H. Morse, Glens Falls, N.Y.

[73] Assignee: North American Instruments Corp., Glen Falls, N.Y.

[21] Appl. No.: 89,494

[22] Filed: Aug. 26, 1987

[51] Int. Cl.[4] .................................................. F16K 5/04
[52] U.S. Cl. ................................ 137/625.47; 251/309; 251/366; 251/904
[58] Field of Search ......................... 137/625.47, 876; 251/287, 288, 309, 312, 314, 366, 368, 904

[56] References Cited

U.S. PATENT DOCUMENTS

| | | | |
|---|---|---|---|
| 1,129,889 | 3/1915 | Miller | 137/625.47 |
| 1,279,900 | 9/1918 | Pearsall | 251/309 X |
| 2,206,816 | 7/1940 | Levitt | 137/625.47 X |
| 2,207,816 | 7/1940 | Packer | 222/482 |
| 2,208,180 | 7/1940 | Delleani | 251/366 X |
| 2,420,785 | 5/1947 | Lorraine | 137/625.47 |
| 3,038,694 | 6/1962 | Dunbeck et al. | 251/309 X |
| 3,142,474 | 7/1964 | La Von Nelson | 251/309 |
| 3,185,179 | 5/1965 | Harautuneian | 137/625.47 |
| 3,344,785 | 10/1967 | Hamilton | 137/625.47 X |
| 3,395,925 | 8/1968 | Dreiding | 251/309 X |
| 3,434,691 | 3/1969 | Hamilton | 251/309 X |
| 3,638,908 | 2/1972 | Grove | 251/366 X |
| 3,698,683 | 10/1972 | De Angelis | 251/309 X |
| 3,734,127 | 5/1973 | Williams et al. | 251/309 X |
| 3,734,461 | 5/1973 | Burger | 251/366 |
| 3,751,004 | 8/1973 | Quirk | 251/366 |
| 3,815,870 | 6/1974 | Milleville et al. | 251/309 |
| 3,834,372 | 9/1974 | Turney | 251/904 X |
| 4,197,876 | 4/1980 | Lobdell | 137/625.47 |
| 4,207,923 | 6/1980 | Giurtino | 137/625.47 |
| 4,291,859 | 9/1981 | Qasim et al. | 251/309 X |
| 4,314,586 | 2/1982 | Folkman | 251/904 X |
| 4,326,698 | 4/1982 | Constantino | 251/327 |
| 4,436,282 | 3/1984 | de Vries | 251/366 |
| 4,522,233 | 6/1985 | Mojadad | 137/625.47 |

Primary Examiner—John Rivell
Attorney, Agent, or Firm—Kenyon & Kenyon

[57] ABSTRACT

A non-crazing, two piece stopcock valve which comprises a body defining a bore therethrough and a core member disposed within the bore. A reduced contact sealing surface is defined around a portion of the core, the sealing surface providing a seal between the core and the bore. The valve further comprises a flange member which extends around the entire outside circumference of the valve body. Such a valve is capable of handling fluids having pressures of at least 1000 psi, and is resistant to crazing and microcracking during use or storage while allowing smooth rotation of the core within the bore.

11 Claims, 2 Drawing Sheets

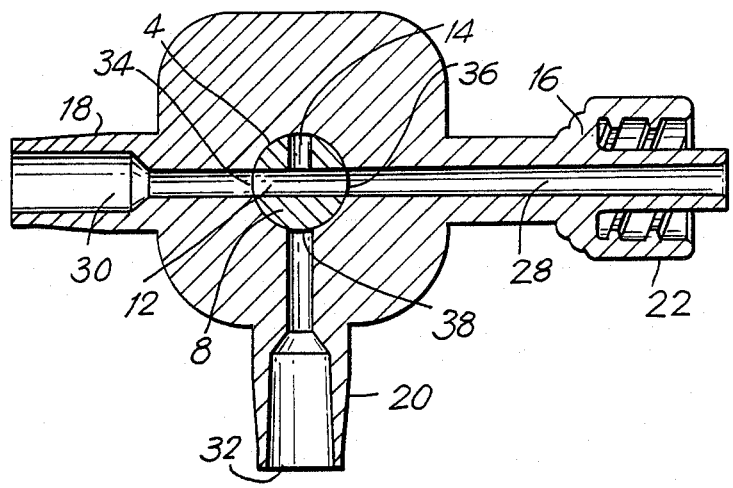
FIG. 3
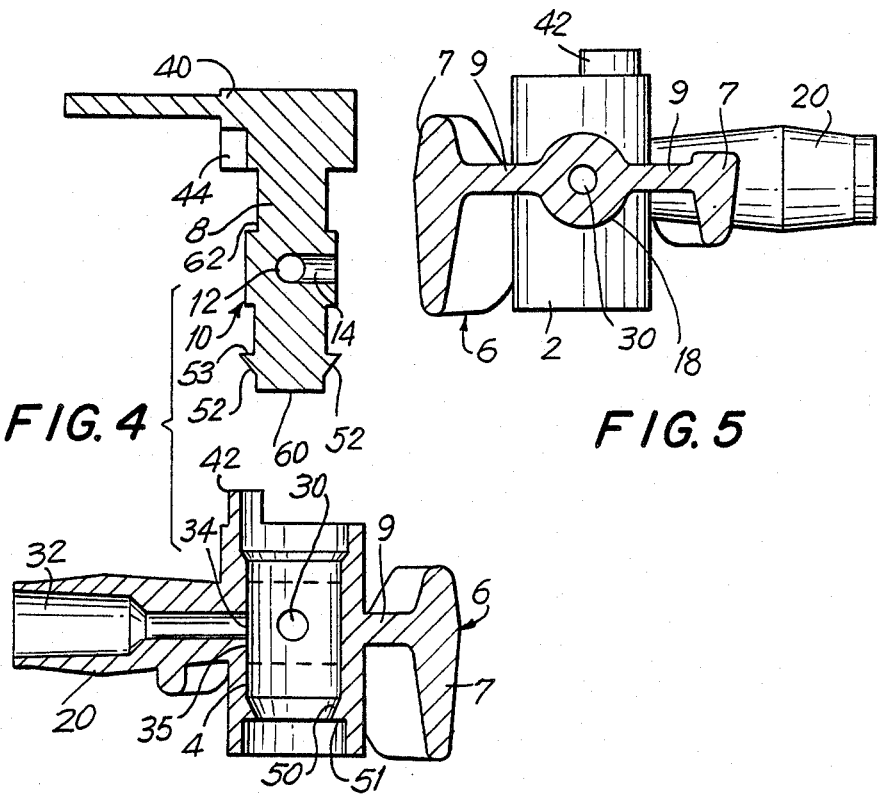
FIG. 4
FIG. 5

STOPCOCK VALVE FOR HIGH PRESSURE APPLICATIONS

The present invention relates to a stopcock valve assembly. More particularly, the invention relates to a non-crazing, two piece, multiple port, preferably two or three-way plastic stopcock valve suitable for use with fluids under high pressure.

BACKGROUND OF THE INVENTION

Plastic stopcock valves are used extensively in the medical arts, as well as various fluid handling industries. These inexpensive valves are normally discarded after use thus assuring a contamination-free valve while relieving personnel from the requirement of cleaning and reassembling the valves after each use.

Such valves typically consist of two pieces, i.e. a valve body and a core. The valve body is provided with a plurality of passage-containing extensions through which a fluid may be conducted. The core includes a conduit capable of putting two or more of the passage-containing extensions in fluid communication with each other when the core is rotated to a specific position in a bore provided in the valve body. By manipulating the core the direction and volume of flow through the valve is regulated. The core is interference fitted within the bore valve in the body by providing a core that is slightly larger in diameter than the bore. The interference fit produces radially directed forces that form a fluid tight seal between the core and the bore.

The radially directed forces are a function of the hoop stress (i.e., the force/unit area) generated by the slightly oversized core pressing against the bore. Of course, if the diameter of the core is much larger than that of the bore, even if the core can be assembled into the bore, the radial forces may be too large to allow rotation of the core within the bore of the valve body.

As mentioned above, the interference fit performs the function of sealing around the extension passages where they enter into the bore of the body such that fluid may pass from one passage, through the conduit means within the core and out another passage without any leakage between the core and the bore. Increased pressure created by fluid passing through the valve increases the hoop stress required to prevent leakage (i.e., the core must be of a larger diameter for a given bore diameter). However, as described above, this may lead to difficulty in rotating the core within the bore.

In addition, the above described valves may also experience crazing or micro-cracking when the valve is in use or has been stored for long periods of time. The presence of cracking in the valve renders the valve useless for most applications. The crazing and micro-cracking appears to be a result of the thinness of the valve body, the high interference fit required to properly seal the core in the bore when the valve is used with a high pressure fluid, and the pressure of fluid within the valve.

Another problem experienced with stopcock valves known as "flecking" occurs when portions of a soft core driven by the hoop stress creep into the passages in the extensions are sheared off by rotation of the core. Chattering or uneven movement is caused by hard or non-compliant core members.

It is therefore an object of the present invention to provide a stopcock valve wherein the stopcock core provides a high pressure seal within the body bore without inhibiting the rotation of the core within the valve body.

It is another object of the present invention to provide a stopcock valve which will be free of crazing and micro-cracking during reasonable storage or use.

It is yet another object to provide a low-cost easily assembled stopcock valve.

Yet another object of the present invention is to provide a stopcock valve provided with a core member that neither flecks nor chatters.

Other objects and advantages of this invention will become apparent from the following specification, claims and drawings.

SUMMARY OF THE INVENTION

It has been discovered that a stopcock valve having a core with a reduced sealing contact surface may properly seal the core within the valve bore and prevent leakage of fluids at pressures of 1000 psi or more while not interfering with the rotation of the core within the valve body. In addition, a valve provided with an exterior flange in combination with the reduced contact surface will prevent crazing or micro-cracking of the valve during storage or use.

The present invention provides such a non-crazing stopcock valve for use with high pressure fluids. The valve is comprised of a valve body having a cylindrical bore therethrough, the valve body having at least two extensions projecting from the exterior surface thereof, each extension defining a passage extending therethrough and opening through ports into the bore. Interference fitted within the bore is a core. A cylindrical sealing surface is defined by a portion of the core, the sealing surface contacting the bore in the vicinity of the passage ports and being sized to provide a fluid tight seal between the core and the bore while permitting rotation of the core within the valve body. The core is further provided with conduit means which may provide a fluid connection between at least two of the extensions. The valve body is provided with a peripheral flange which extends away from and entirely around the valve body exterior, coplanar with the passage-containing extensions and parallel to the reduced contact sealing surface of the core.

While the sealing contact between the core and the body is sufficient to maintain the core within the body bore in most applications, in a further embodiment of the present invention, the body and core may define complimentary stop members which may engage each other when the core is inserted to further maintain the core within the body bore and to prevent removal of the core therefrom. The core may also be provided with a handle to permit manual rotation.

BRIEF DESCRIPTION OF THE DRAWINGS

FIG. 3 is a cross-sectional view of the valve taken along line III—III in FIG. 2;

FIG. 4 is exploded cross-sectional view of the valve taken along line IV—IV in FIG. 1; and FIG. 5 is a cross-sectional side view of the valve taken along the V—V in FIG. 1 with the core removed.

DETAILED DESCRIPTION OF THE INVENTION

Figure 1:
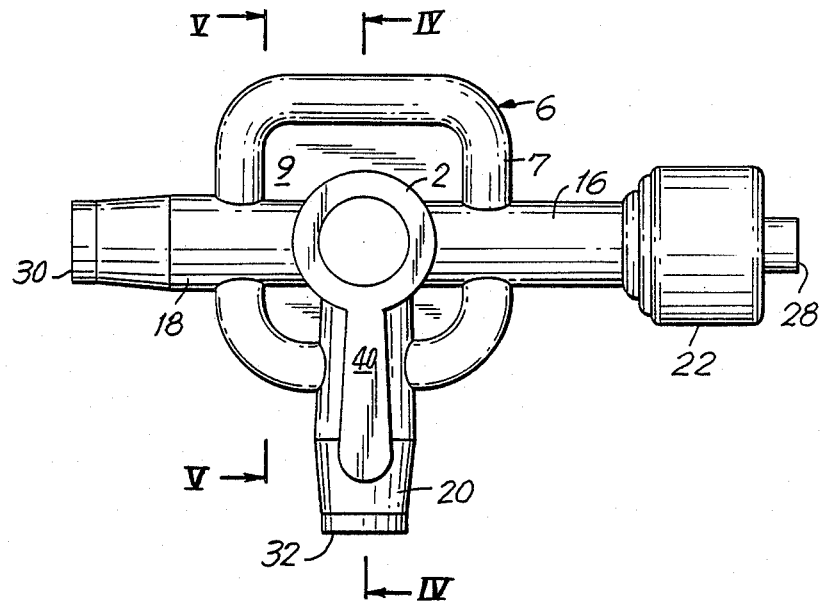
FIG. 1 is a top plan view of the stopcock valve of the present invention.
Figure 2:
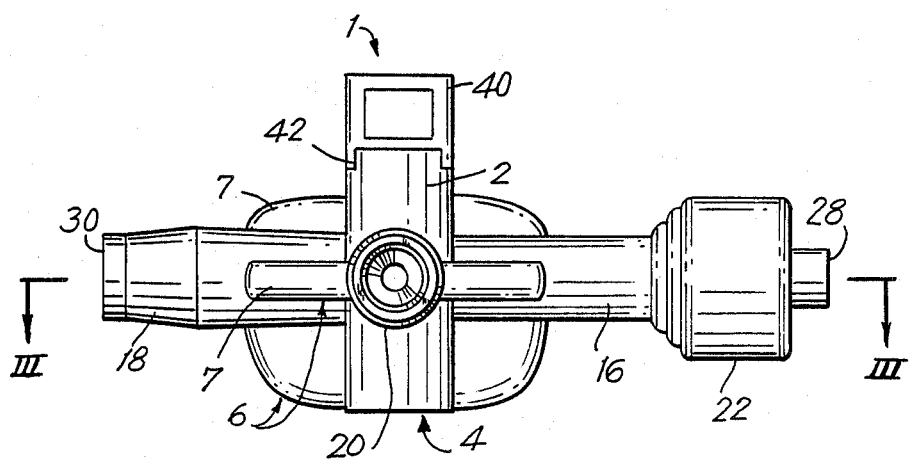
FIG. 2 is an elevational view of the valve of FIG. 1.

Referring to the FIG. 1, the valve of the present invention has a cylindrical body 2 (better seen in FIG. 2) with a generally straight cylindrical axial bore 4 extending the length of body 2. The bore 4 contains a rotatable core 8 disposed therein.

Valve body 2 has three tubular extensions 16, 18 and 20 projecting away from body 2. As depicted in the figures, these extensions project in a direction perpendicular to the axis of bore 4 but may, if desired, project at any angle suitable for the specific application to which the valve is to be put.

The tubular extensions 16, 18 and 20 contain passages 28, 30 and 32, respectively, which run the entire length of extensions 16, 18, and 20. Passages 16, 18 and 20 open into bore 4 through ports 36, 34 and 38, respectively, at one end and to the exterior of the valve at the other opposite end.

Core 8 is provided with a reduced contact sealing surface 10 (best seen in FIG. 4) which extends around the entire circumference of core 8 and along a portion of the length thereof. When core 8 is disposed within bore 4 the sealing surface 10 presses against the interior of the bore providing a rotatable seal between core 8 and bore 4 in the area 35 where ports 34, 36 and 38 enter. The preferred interference is about 0.004 to 0.010 in and more preferably about 0.007. In this way an interference first produces sufficient hoop stress to fluidly seal around ports 34, 36 and 38 without producing enough force to inhibit manual rotation of the core 8 within the bore 4. The core 8, has a first end 62 provided with a handle 40 to aid in the rotation of core 8 in bore 4. The distance between the periphery of ports 34, 36 and 38 and the exterior edges of the sealing surface 10 should be at least 0.025 in. and is preferably about 0.075 in., to provide a reliable seal. It should be understood that the relationship between the interference fit and size of the sealing surface 10 may be adjusted to provide a good seal and easy rotation.

Core 8 further defines conduit means whereby the extension passages may be fluidly connected to one another. The conduit means illustrated in the drawings is comprised of two traverse passages 12 and 14. Passage 12 extends straight through core 8 while passage 14 extends from passage 12 to the outside of the core 8. Passage 14 will typically form a 90 degree angle with passage 12, however, the actual angle used will depend on the location of the body extensions positioned around the body 2. Thus it can be seen that rotation of the core 8 will put any two of or all three passages 28, 30 and 32 in fluid communication with each other or alternatively out of communication with each other.

The valve 1 of the present invention is further provided with a flange member 6 which extends peripherally around the valve body substantially co-planer with body extensions 16, 18 and 20 and, more importantly, parallel to the reduced contact sealing surface 10 of core 8. The flange 6 comprises a flat extension section 9 which extends away from valve body 2. The periphery of extension section 9 defines an enlarged or thickened hoop section 7. The hoop section 7 is preferably larger around the portion of the valve circumference which contains no extensions (i.e., the portion extending in a clockwise direction from extension 18 to extension 16, as seen in FIG. 1) then around the valve body circumference portion that does contain the extensions. In this way sufficient "bulk," is provided around the entire valve body to provide adequate reinforcement in the area of highest stress, i.e., the area where the sealing surface contacts the bore wall which is where fluid is to be conducted through the valve. The flange 6 provides extra support and reinforcement for the valve 1 and serves (in combination with the reduced sealing contact) to prevent crazing and micro cracking of the valve during use or while being stored.

Another advantage of the present invention is its large size or bulk which facilitates one hand operation.

In addition to the above elements, the valve of the present invention may be provided with further means for rotatably retaining core 8 within bore 4. This retention means is comprised of a first stop member 52, e.g., an annular ring, provided around the circumference of core 8 adjacent to the second end of core 8. A second stop member 50, also an annular ring, is disposed within bore 4 in a position complementary to that of the first stop member 62. When, core 8 is inserted into bore 4 the second stop member 50 passes and is engaged by first stop member 52 to securely fix the core 8 within bore 4. Each of the stop members 50 and 52 are provided with opposing horizontal surfaces, 51 and 53, respectively, which face each other when first stop member 52 slides past second stop member 52 such that the faces 51 and 53 engage thereby preventing the core from being removed from the bore.

The valve 1 of the present invention may also be provided with means for limiting the rotation of core 8 within bore 4. This limiting means preferably comprises a guide member 42 which is positioned on top of the valve along a portion of the top of bore 4. Guide member 42 engages a slot 44 provided around a portion of the circumference of a handle 40. The guide 42 and slot 44 are sized and positioned to limit the rotation of core 8 within bore 4. For example, in one possible configuration when the core 8 is turned in a first direction so that guide member 42 rests against one end of slot 44 passages 28 and 30 may fluidly communicate with each other. When the core 8 is rotated in a second, opposite direction so that guide member 42 rests against the opposite end of slot 44, passages 28 and 32, may fluidly communicate with each other. It will be appreciated by those skilled in the art that the location of the slot 44 and guide 42, as well as the conduit means within the core 8 may vary from valve to valve thereby allowing fluid communication between different combinations of passages. The application of these variables will depend on the particular application to which the valve is to be put.

The valves of the present invention may be formed from any material appropriate for the particular application and environment in which the valve is to be used. However, the objects and advantages of the present invention are most readily achieved in a valve having a core formed from acetal copolymer M270-14 available from Celanese Plastic Company, Chatham, N.J. (for the handle), compound RX 31112 available from MOBAY Chemical Corp., Pittsburgh, Pa. (for the body) and the like. Clear polycarbonates have been found useful for making valve bodies and the core member material should be soft enough to avoid chattering and hard enough to avoid flecking.

It has been discovered that the valve of the present invention will provide a substantially leak proof seal while not experiencing the micro-cracking and crazing experienced in prior art valves when they are exposed to high pressure fluids or when stored for long periods of time. This is believed to be due to a combination of the reduced sealing surface 10 of the core 8 and the stress absorbing flange 6 employed in the valves of the present invention. The reduction of the sealing surface 10 reduces the total radial forces generated by the interference fit between the core 8 and the body bore 4 while maintaining a sufficient contact with the bore to seal between extension passages 28, 30 and 32 and conduit means within core 8 while the flange 6 reinforces and supports the valve body to prevent crazing and microcracking.

What is claimed is:

1. A high pressure, plastic stopcock valve comprising:
    a valve body having an exterior surface, the body defining a bore, said bore defining an interior surface within said body;
    at least two extensions projecting from said exterior surface, each said extension defining a passage into a port, the port extending through said interior surface fluidly connecting said bore with said passages;
    a core having a first end and a second end, disposed within said bore, such that said first end extends out of said bore;
    a reduced contact sealing surface defined by a portion of said core in sealing contact with said interior surface in the vicinity of said ports, said sealing surface providing a fluid tight seal between said interior surface and said core while permitting rotation of said core within said bore;
    conduit means within said core for fluidly connecting at least two of said extensions; and
    a radial flange extending peripherally around said exterior surface of said valve body, substantially coplanar with said ports and parallel to said sealing surface for preventing crazing and cracking in said valve body.

2. The stopcock valve of claim 1 wherein the portion of the core defining the sealing surface is substantially cylindrical.

3. The stopcock valve of claim 2 wherein the sealing surface extends along a sufficient portions of the core to provide substantially leak free passage of a fluid through said valve at least a pressure of 1000 psi while allowing for rotation of said core within said bore.

4. The stopcock valve of claim 3 wherein there are three extensions lying in the same radial plane around said bore.

5. The stopcock valve of claim said 4 further comprising a handle attached to said first end of said core.

6. The stopcock valve of claim 5 further comprising means for rotatably engaging said core within said bore.

7. The stopcock valve of claim 6 wherein the engaging means comprises:
    a first stop member extending out from said core adjacent to said second end; and
    a second stop member extending out from said interior surface in a position complementary to the first stop member such that when said core is inserted into said bore, the first stop member is forced past and engages with said second stop member.

8. The stopcock valve of claim 6 wherein the radial flange is comprised of:
    a flat extension section having a first end and a second end, said first end joined to said exterior surface of said valve body; and
    an enlarged hoop section provided at said second end of said flat extension.

9. The stopcock valve of claim 8 further comprising means for limiting the rotation of the core within the bore.

10. The stopcock valve of claim 9 wherein the limiting means comprises:
    a guide member provided on said exterior surface adjacent to a portion of said bore; and
    a slot provided around a portion of said core handle, said slot engaging said guide member.

11. The stopcock valve of claim 1 wherein said valve body consists of a single cylindrical wall.

* * * * *